(No Model.)
G. H. SMITH.
TREATMENT OF GUM.
No. 468,366. Patented Feb. 9, 1892.
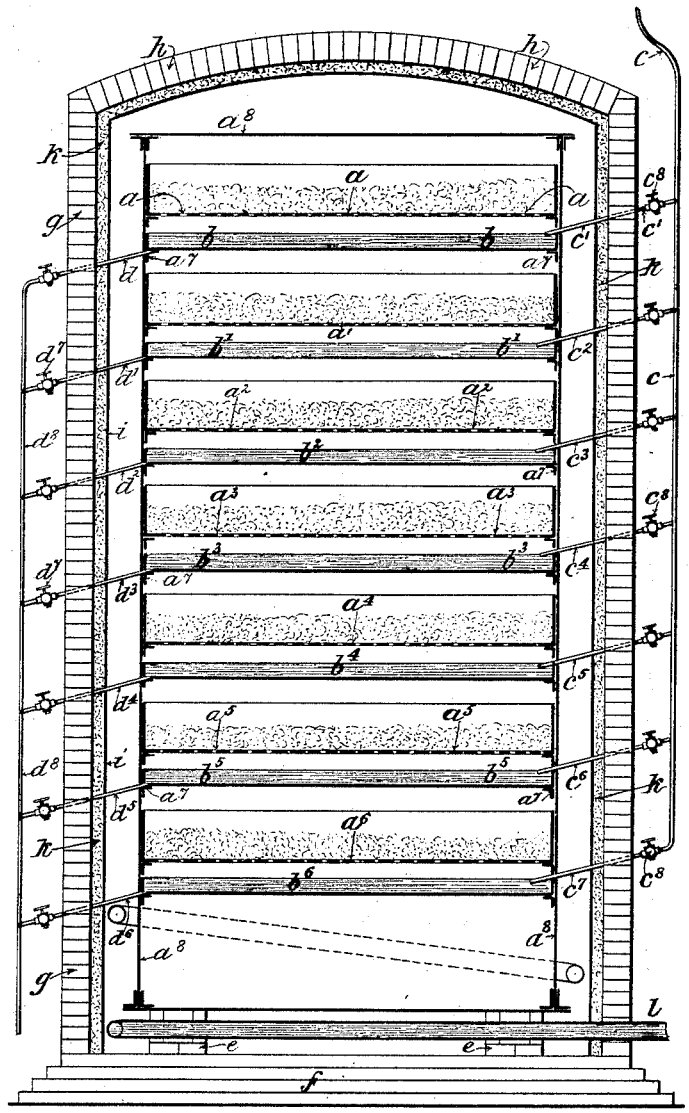
Witnesses
Will T. Norton
Edwin Bell
Inventor
George H. Smith
by John J. Halsted & Son
his Attys.

UNITED STATES PATENT OFFICE.

GEORGE HAND SMITH, OF LONDON, ENGLAND.

TREATMENT OF GUM.

SPECIFICATION forming part of Letters Patent No. 468,366, dated February 9, 1892.

Application filed July 5, 1889. Serial No. 316,486. (No model.) Patented in England April 17, 1889, No. 6,581; in France May 10, 1889, No. 198,124; in Belgium May 11, 1889, No. 86,199, and in Germany May 14, 1889, No. 54,794.

*To all whom it may concern:*

Be it known that I, GEORGE HAND SMITH, doctor of medicine, a citizen of the United States of America, temporarily residing in London, in the county of Middlesex, England, have invented certain new and useful improvements in treatment of gum-copal, gum-resins, and other gums for the manufacture of varnishes and other solutions for coating surfaces and for other uses, (patented in Great Britain April 17, 1889, No. 6,581; in France May 10, 1889, No. 198,124; in Belgium May 11, 1889, No. 86,199, and in Germany May 14, 1889, No. 54,794,) of which the following is a specification.

The object of my process is to improve the quality of the aforesaid gums and their suitability for the manufacture of varnishes and other solutions for coating surfaces and for other uses. It is specially useful for the treatment of the harder or more insoluble gums, as it reduces the gums to a state of increased solubility or tractability to the action of solvents and effects its object without exposing them to the action of heat, except at so moderate a temperature as not to be injurious to the said gums.

My invention consists in subjecting the said gums to the action of the vapors of volatile solvents prior to their being dissolved in solvents of the same or like nature to produce solutions of the gums. By this process they are rendered tractable to the solvent action of the said solvent liquids.

To carry out my invention, I expose the gums in a comminuted state in layers upon perforated plates or reticulate surfaces or floors arranged at proper distances apart in a chamber or chambers, which may be constructed of iron or brick lined with iron, which may be capable of supporting and containing large quantities of the matters to be treated. The volatile liquids to be used are placed in shallow trays or other means of exposure open above, (or so arranged as best to maintain dispersion in vapor,) placed beneath the perforated plates or floors, which are supplied through proper pipes with suitable inlet and outlet taps. These trays are gently heated to a temperature sufficient for setting up and maintaining the desired vaporous atmosphere, (and the heat is maintained uniform by the aid of thermometers placed in the trays, if necessary,) so as to cause the vapor to fill the spaces in which the gums are placed to act upon the gums until the action is complete. The duration of treatment may vary from some hours to days, according to quantity or other conditions of mass treated, the character of gums employed, or product desired. The object to be attained, as before stated, is to render the gums more readily soluble in usual solvents suitably applied for manufacturing purposes without fusion or high and destructive heats, as is general in varnish manufacture.

Gums treated by this process are rendered more soluble while preserving brilliancy, elasticity, and quality and are especially improved for the manufacture of varnishes and other covering products. The agents employed with heat in these chambers are phenol or phenolic or derivative bodies, creosol or creosylic acid, or other coal-tar distillates having solvent properties for the gums, or analogous solvents of a volatile character. It is not necessary that only one of these should be applied, as they may be used mixed, or in succession provided that the solvents thus mixed or succeeding one to the other are not of a kind to interfere with one another's solvent action. The temperature ordinarily employed may be 200° or 212° Fahrenheit, but will vary according to the gum to be treated. Other things being equal, the higher the temperature the less time required in the exposure of the gums. So, also, the harder or more refractory the gums the longer the time of exposure required. Generally the lower the temperature the lighter the color of the resultant gums. Experimental treatment on a sample as described will readily show the proper limits of temperature and time suited to particular qualities or specimens of gum, so as to produce a required result. Or samples may be drawn during the process and the process continued until the desired result is obtained. It will be observed that by my process the gums, &c., are not removed from the perforated floors during the process, but are withdrawn in a solid mass, and as brittle as natural gum, softened only in the sense of future solubility. It would be detrimental to the process to raise the gums to sufficient heat or to add sufficient solvent to cause the gum to flow through perforations. My process deals mainly with the hard gums used for varnishes.

In the drawing, the figure shows a vertical sectional elevation of an apparatus adapted for carrying out the present invention for the treatment of hard gums by subjecting them to the action of the vapor of volatile solvents. This apparatus consists of a series of trays or supports $a\ a'\ a^2\ a^3\ a^4\ a^5\ a^6$, arranged one above another and each having its bottom formed of open-work, perforated plates, or reticulate or woven-wire work, upon which the gums to be treated are placed. These trays ride on supports $a^7$, projecting from the sides of the inner metal chamber $a^8$, which chamber is formed with a door, preferably reaching from top to bottom of the chamber and formed double, packed with non-conducting packing of a suitable or ordinary kind. This door is not shown, as it would be of ordinary construction and simply provided to give access to the trays for renewing the supply of gum or otherwise.

$b\ b'\ b^2\ b^3\ b^4\ b^5\ b^6$ are shallow trays, adapted to contain and expose suitable liquid for providing the vapors to act upon the gums on the trays above them.

$c$ is a conduit or pipe of supply for the liquid supplied to the trays $b\ b'\ b^2\ b^3\ b^4\ b^5\ b^6$ by means of branches $c'\ c^2\ c^3\ c^4\ c^5\ c^6\ c^7$ therefrom, each branch having a controlling-valve $c^8$.

$d\ d'\ d^2\ d^3\ d^4\ d^5\ d^6$ are pipes leading from the trays $b\ b'\ b^2\ b^3\ b^4\ b^5\ b^6$ and communicating with the conduit or pipe $d^8$, each branch being controlled by a separate valve $d^7$.

$d^8$ is, with its tributaries $d\ d^6$, only designed for use when change of contents or emptying of the troughs $b\ b'$ is needed. The metal-chamber $a^8$ is shown supported by blocks or brick supports $e$, which again are supported on the foundation $f$, from which spring surrounding brick walls $g$, which support a roof $h$.

$i$ is an internal lining, supported some short distance within the outer wall $g$, the space $k$ between this lining and the wall being packed with non-conducting packing, so as to prevent as much as possible the escape or variation of heat.

$l$ is one end of a series of steam-pipes which pass around the lower portion of the chamber formed within the walls $a^8\ g$ and below the chamber $a^8$, so as to heat the contained atmosphere and cause vapor to be evolved from the liquid in the trays $b\ b'\ b^2\ b^3\ b^4\ b^5\ b^6$. After the hard gums, broken up or reduced to suitable-sized pieces in the trays, have been submitted to the vapors at the desired temperature for a suitable time they are removed therefrom and are ready for further treatment.

Although I have in the foregoing description and in the drawing alluded more particularly to apparatus wherein the vapor is generated directly, such vapor may be introduced from another chamber in which the generation is effected; but I prefer to generate the vapor within the apparatus itself on account of the economy of heat, more direct and effective action of the vapors, and other advantages. The operation may be repeated, if required.

Having now particularly described and ascertained the nature of my said invention and in what manner the same is to be performed, I declare that what I claim is—

1. The described process of reducing the hardness of gum-resins and gums for varnishes, but yet leaving them in a solid form, consisting in subjecting them to the softening action of vapors of solvents in closed vessels on suitable supports, the process being so regulated with regard to the temperature and quantity of solvent vapors used that the hardness of the gums will be reduced but their solid form still be retained.

2. The herein-described apparatus for the treatment of comminuted gum-resins and gums for varnish, consisting of a non-conducting casing $i$, an inner vessel $a^8$, reticulate gum-supporting trays, as $a$, solvent-liquid trays, as $b$, inlet-conduit $c$ and its branches, outlet-conduit and its branches, as $d$, and steam-pipe $l$, substantially as hereinbefore set forth.

In testimony whereof I, the said GEORGE HAND SMITH, have hereunto set my hand this 20th day of June, 1889.

GEORGE HAND SMITH.

Witnesses:
ALFRED GEORGE BROOKES,
PERCY WOODWARD.